United States Patent
Weiss et al.

(10) Patent No.: US 11,635,608 B2
(45) Date of Patent: Apr. 25, 2023

(54) METHOD AND MICROSCOPE FOR DETERMINING THE REFRACTIVE INDEX OF AN OPTICAL MEDIUM

(71) Applicant: Leica Microsystems CMS GmbH, Wetzlar (DE)

(72) Inventors: Alexander Weiss, Linden (DE); Christian Schumann, Lich (DE); Ronja Capellmann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 234 days.

(21) Appl. No.: 17/285,481

(22) PCT Filed: Oct. 11, 2019

(86) PCT No.: PCT/EP2019/077619
§ 371 (c)(1),
(2) Date: Apr. 15, 2021

(87) PCT Pub. No.: WO2020/078848
PCT Pub. Date: Apr. 23, 2020

(65) Prior Publication Data
US 2021/0341721 A1    Nov. 4, 2021

(30) Foreign Application Priority Data
Oct. 19, 2018 (DE) .................. 10 2018 126 002.4

(51) Int. Cl.
*G02B 21/18* (2006.01)
*G01N 21/41* (2006.01)
(Continued)

(52) U.S. Cl.
CPC ............. *G02B 21/18* (2013.01); *G01M 11/02* (2013.01); *G01N 21/4133* (2013.01); *G02B 21/06* (2013.01)

(58) Field of Classification Search
CPC ....... G02B 21/18; G02B 21/06; G01M 11/02; G01N 21/4133
See application file for complete search history.

(56) References Cited

U.S. PATENT DOCUMENTS

| | | | | |
|---|---|---|---|---|
| 5,017,008 A | * | 5/1991 | Akiyama | ............... G01N 21/05 356/336 |
| 2010/0171946 A1 | | 7/2010 | Hecker | |
| 2011/0317260 A1 | | 12/2011 | Krueger | |

FOREIGN PATENT DOCUMENTS

| | | |
|---|---|---|
| DE | 102006021996 A1 | 2/2007 |
| DE | 102010030430 A1 | 12/2011 |
| JP | H11-230903 A | 8/1999 |

OTHER PUBLICATIONS

Born and Wolf, "Principles of Optics," 7th edition, Cambridge University Press, UK, Dec. 1999, pp. 40-45.
(Continued)

*Primary Examiner* — Hwa Andrew Lee
(74) *Attorney, Agent, or Firm* — Leydig, Voit & Mayer, Ltd.

(57) ABSTRACT

A method is useable for determining a refractive index of an optical medium in a microscope, which has an objective facing toward a sample chamber. The optical medium is one of two optical media, which border two opposing surfaces of a cover slip or object carrier in the sample chamber and form two partially reflective interfaces, which are arranged at different distances from the objective. The method includes: deflecting a measurement light beam by the objective with oblique incidence on the cover slip or object carrier; generating two reflection light beams spatially separated from one another by the measurement light beam being partially reflected at each of the interfaces; receiving the two reflection light beams by the objective and conducting them onto a position-sensitive detector; registering intensities by the
(Continued)

position-sensitive detector; and determining the refractive index of the optical medium based on the registered intensities.

15 Claims, 7 Drawing Sheets

(51) Int. Cl.
    *G01M 11/02*    (2006.01)
    *G02B 21/06*    (2006.01)

(56) References Cited

OTHER PUBLICATIONS

Linke, F. und Merkel, R.: Quantitative ellipsometric microscopy at the glass-water interface, New Journal of Physics, vol. 7, May 20, 2005, p. S.128-1-128-17, Online.
J. P. McClymer: "Note: Index of refraction measurement using the Fresnel equations", Review of Scientific Instruments, vol. 85, No. 8, Aug. 19, 2014, AIP Publishing LLC, US, pp. 086107-1-086107-3.
Ming-Horng Chiu et al.: "Complex refractive-index measurement based on Fresnel's equations and the uses of heterodyne interferometry", Applied Optics, vol. 38, No. 19, Jul. 1, 1999, Optical Society of America, US, pp. 4047-4052.

\* cited by examiner

METHOD AND MICROSCOPE FOR DETERMINING THE REFRACTIVE INDEX OF AN OPTICAL MEDIUM

CROSS-REFERENCE TO PRIOR APPLICATIONS

This application is a U.S. National Phase Application under 35 U.S.C. § 371 of International Application No. PCT/EP2019/077619, filed on Oct. 11, 2019, and claims benefit to German Patent Application No. DE 10 2018 126 002.4, filed on Oct. 19, 2018. The International Application was published in German on Apr. 23, 2020 as WO 2020/078848 under PCT Article 21(2).

FIELD

The invention relates to a method for determining the refractive index of an optical medium in a microscope, which has an objective facing toward a sample chamber, wherein the optical medium having the refractive index to be determined is one of two optical media which border two opposing surfaces of a cover slip or object carrier in the sample chamber and thus form two partially reflective interfaces which are arranged at different distances from the objective. The invention furthermore relates to a microscope having a device for determining the refractive index of an optical medium.

BACKGROUND

The light-microscopy imaging of a sample is influenced by the various optical media which border one another in a sample chamber of a microscope. These optical media form interfaces as a result of their different refractive indices, at which the refractive index changes suddenly. Each of these interfaces has a different effect on the optical image depending on how large the jump of the refractive index is there. In particular the spherical aberration is significantly influenced by the sudden variation of the refractive index. The optical media having an effect on the imaging typically include a cover slip or object carrier and the two media which border the cover slip or object carrier from opposite sides. The latter are formed, for example, by an immersion medium, which is located between the cover slip or object carrier and the objective, and an embedding medium surrounding the sample.

To enable effective correction of the imaging errors which are influenced by a sudden variation of the refractive index, it is important to know the refractive indices of the optical media used. The refractive indices of the cover slip or object carrier and of the immersion medium are often known beforehand with high accuracy in this case. However, this does not apply to the refractive index of the embedding medium surrounding the sample. This refractive index is therefore to be ascertained in a measurement provided separately for this purpose outside or inside the microscope.

A measurement of the refractive index outside the microscope is linked to the unpredictability of a sample preparation taking place after the measurement. A correlation of the measured value obtained outside the microscope with the refractive index actually effective in the light-microscopy imaging cannot be ensured. Thus, in some applications, for example in living cell microscopy, the refractive index of the embedding medium is significantly influenced by the sample and is thus not measurable at all with sufficient accuracy outside the microscopic preparation.

DE 102006021996 A1 discloses a microscope for total internal reflection microscopy, abbreviated TIRF, which enables a determination of the refractive index within the microscope. This TIRF microscope comprises an objective through which the sample is subjected to an evanescent illumination. The illumination light totally reflected at the sample is registered by means of a detector. The angle of incidence of the total reflection is determined by means of the transition at which the intensity of the illumination light reflected at the sample drops from a maximum value to zero. The refractive index is then ascertained on the basis of the angle of incidence. Such a determination of the refractive index requires, however, an immersion objective having high numerical aperture, in order to be able to illuminate the sample under total reflection. Such an objective is complex to manufacture and thus costly.

Furthermore, reference is made to prior art DE 102010030430 A1, in which a triangulating autofocus device for a microscope is disclosed. This autofocus device generates a slit image on the sample, which is imaged on a position-sensitive detector. The autofocus is controlled via the incidence position registered by the detector.

SUMMARY

In an embodiment, the present invention provides a method for determining a refractive index of an optical medium in a microscope, which has an objective facing toward a sample chamber. The optical medium having the refractive index to be determined is one of two optical media, which border two opposing surfaces of a cover slip or object carrier in the sample chamber and form two partially reflective interfaces, which are arranged at different distances from the objective. The method includes: deflecting a measurement light beam by the objective with oblique incidence on the cover slip or object carrier; generating two reflection light beams spatially separated from one another by the measurement light beam being partially reflected at each of the two partially reflective interfaces; receiving the two reflection light beams by the objective and conducting the two reflection light beams onto a position-sensitive detector; registering intensities of the two reflection light beams by the position-sensitive detector; and determining the refractive index of the optical medium based on the registered intensities of the two reflection light beams.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the invention provide a method and a microscope which enable simple and precise determination of the refractive index of an optical medium.

The method according to an embodiment of the invention is used for determining the refractive index of an optical medium in a microscope, which has an objective facing toward a sample chamber, wherein the optical medium having the refractive index to be determined is one of two optical media which border two opposing surfaces of a cover slip or object carrier in the sample chamber and thus form two partially reflective interfaces which are arranged at different distances from the objective. In the method, a measurement light beam is deflected through the objective with oblique incidence on the cover slip or object carrier. Two reflection light beams spatially separated from one another are generated in that the measurement light beam is partially reflected at each of the two interfaces. The two reflection light beams are received by the objective and conducted onto a position-sensitive detector. The intensities of the two reflection light beams are registered by means of the position-sensitive detector. The refractive index of the optical medium is ascertained on the basis of the registered intensities of the two reflection light beams.

A cover slip or object carrier is understood in this application in particular as a cover slip covering a sample, a slide, a bottom of a petri dish, or a bottom of a well of a microtitration plate.

The intensities of the two reflection light beams are dependent on the reflection and the transmission of the measurement light beam at the two interfaces, which are defined by the cover slip or object carrier and the two optical media, which border the cover slip or object carrier from opposite sides. The reflection and transmission processes, on which the intensities of the two reflection light beams spatially separated from one another are ultimately based, are thus essentially determined by the refractive indices of the cover slip or object carrier and of the optical media bordering the cover slip or object carrier. If the refractive index of the cover slip or object carrier and the refractive index of one of the two optical media adjoining thereon are known, the refractive index of the other medium may thus be reliably determined from the intensities registered by the position-sensitive detector and the knowledge of the angle of incidence of the measurement light beam in the sample chamber.

The spatial separation of the two reflection light beams is achieved in that the measurement light beam is deflected obliquely onto the cover slip or object carrier. Since the two partially reflective interfaces are axially offset in relation to one another, i.e., spaced apart from one another along the optical axis of the objective, the oblique incidence of the measurement light beam at the two interfaces ensures that the two reflection light beams are reflected back into the objective on different optical paths. As a result, the two reflection light beams can thus be registered separately from one another on the position-sensitive detector at different incidence locations.

Embodiments of the invention enables simple and precise determination of the refractive index of an optical medium within the microscope. This can be used productively for adjusting further microscope parameters. In particular, an embodiment of the invention enables an automation of a correction adjustment for different embedding media provided on the microscope objective, for example, in that a correction lens contained in the microscope objective is automatically activated as a function of the ascertained refractive index. It is also possible to perform modeling of a point spread function in the context of a deconvolution as a function of the ascertained refractive index.

In one advantageous refinement, the refractive index of the one optical medium is ascertained as a function of the refractive index of the other optical medium, the refractive index of the cover slip or object carrier, and the numerical aperture of the measurement light beam. The numerical aperture of the measurement light beam can be determined via the focal length of the objective and the position of the measurement light beam in the objective pupil.

The reflectivities and transmittances of the two interfaces, the refractive indices of the cover slip or object carrier and the optical media which define the respective interface, and the numerical aperture of the measurement light beam are linked to one another via the so-called Fresnel formulae. The reflectivities and transmittances may be determined on the basis of the intensities of the two reflection light beams. If the refractive index of the cover slip or object carrier, the numerical aperture of the measurement light beam, and the refractive index of one of the two optical medium are additionally known, the refractive index of the other medium can thus be calculated easily.

In one preferred embodiment, the refractive index of the one optical medium is ascertained on the basis of the ratio of the intensities of the two reflection light beams. The measurement according to an embodiment of the invention of the refractive index is thus quasi-self-referential. This means that the refractive index can be determined independently of the intensity of the measurement light beam, i.e., no knowledge of this intensity is required.

The measurement light beam is preferably conducted into a section of an entry pupil of the objective which is offset in relation to the center of the entry pupil. In this way, the entry pupil of the objective is backlit in a decentralized manner by the measurement light beam, whereby the measurement light beam is positioned obliquely to its optical axis upon exit from the objective. This decentralized backlighting of the entry pupil thus enables in a particularly simple manner the desired spatial separation of the reflection light beams generated at the two interfaces. The reflection light beams are then preferably conducted back into the objective so that they penetrate another section of the entry pupil in the direction opposite to the propagation direction of the measurement light beam, which is offset in relation to the above-mentioned section of the entry pupil.

In one advantageous embodiment it is provided that a measurement pattern is generated by each of the measurement light beams at the two interfaces, and that the two measurement patterns are imaged by the two reflection light beams on the position-sensitive detector. It is thus possible, for example, to generate the respective measurement pattern in the form of an image of a slit diaphragm, which is part of the light source emitting the measurement light beam or is arranged in front of it.

The two measurement patterns imaged on the position-sensitive detector are preferably registered in the form of a spatial intensity distribution, from which the intensities of the two reflection light beams are determined. If the measurement patterns imaged on the position-sensitive detector are given, for example, by the images of a slit diaphragm, the above-mentioned intensity distribution is thus obtained by integrating the respective diaphragm image on the detector over a direction which is parallel to the longitudinal alignment of the slit diaphragm. The location of the respective diaphragm image registered on the detector, which is dependent on the distance between the associated partially reflective interface and the objective, is reflected in this case by a peak occurring in the intensity distribution.

The optical medium, the refractive index of which is to be determined according to an embodiment of the invention, is preferably an embedding medium for a sample which borders one of the two surfaces of the cover slip or object carrier. In this case, the other optical medium, the refractive index of which is known beforehand, is preferably an immersion medium which borders the other surface of the cover slip or object carrier, on the one hand, and the objective, on the other hand. However, it is obvious that the method according to embodiments of the invention is not restricted thereto. It is thus possible to ascertain the refractive index of any arbitrary medium if it borders directly on one of the two surfaces of the cover slip or object carrier and thus forms a partially reflective interface.

The microscope according to an embodiment of the invention comprises a sample chamber having a cover slip or object carrier and two optical media, an objective assigned to the sample chamber, two partially-reflective interfaces, which are arranged in the sample chamber at different distances from the objective and are formed in that the two optical media in the sample chamber border two opposing surfaces of the cover slip or object carrier, and a device for determining the refractive index of one of the two optical media. The above-mentioned device is designed to deflect a measurement light beam through the objective with oblique incidence on the cover slip or object carrier. Furthermore, the device is designed to generate two reflection light beams spatially separated from one another, in that the measurement light beam is partially reflected at each of the two interfaces. The device has a position-sensitive detector and is designed to receive the two reflection light beams through the objective and deflect them on the position-sensitive detector. The position-sensitive detector is designed to register the intensities of the two reflection light beams. The device provided for determining the refractive index furthermore comprises an ascertainment unit which is designed to ascertain the refractive index of the optical medium on the basis of the registered intensities of the two reflection light beams.

The device preferably has an aperture diaphragm having a diaphragm opening, which is arranged in a decentered manner at a distance to the optical axis of the objective. The aperture diaphragm delimits the cross section of the measurement light beam in such a way that the latter backlights the entry pupil of the objective in a decentralized manner and thus exits obliquely to the optical axis from the objective. In this way, it is ensured that the reflection light beams generated on the two partially reflective interfaces are conducted spatially separated from one another back into the objective and can ultimately be registered on the position-sensitive detector at different incidence locations. The decentralized backlighting of the entry pupil of the objective furthermore has the advantage that axis-proximal beam components are avoided, which cause so-called first-order reflections, which arise most strongly at the surface vertices of the lenses forming the objective and worsen the signal-to-noise ratio.

In one preferred embodiment, the device has a light source which emits the measurement light beam in the infrared wavelength range. This has the advantage that the measurement patterns generated by the measurement light beam on the cover slip or object carrier are not visible to the human eye and thus do not interfere with the observation of the sample through the microscope. However, it is also possible to use a measurement light beam in the visible wavelength range. If the measurement light beam consists of light in the infrared wavelength range, the refractive index in the visible spectral range can be concluded by means of a suitable model of the medium or a calibration.

The position-sensitive detector is preferably a line detector, which is aligned so that it can register the intensity distribution of the two reflection light beams, which reflect the two images of the measurement pattern, in their entirety. Alternatively, the position-sensitive detector can also be embodied as a surface detector, for example as a two-dimensional CCD camera.

In one advantageous embodiment, the ascertainment unit has a storage unit in which parameters for ascertaining the refractive index of the optical medium are storable. It is thus possible, for example, to save the parameters relevant for the ascertainment of the refractive index for a large number of microscope components, which are used alternately in the microscope depending on the application. Thus, for example, the refractive indices of various immersion media and various cover slips or object carriers and the optical data of various objectives can be stored and read out as needed to determine the desired refractive index.

The opposing surfaces of the cover slip or object carrier are preferably formed plane-parallel to one another.

The device according to embodiments of the invention is also suitable because of its presently described structural and functional properties to be used in the microscope as an autofocus device. Moreover, the device offers the option because of its properties of also determining other variables influencing the light-microscopy imaging, in addition to the refractive index of an optical medium, for example the thickness and/or the tilt of the cover slip or object carrier.

Embodiments of the invention are applicable to a variety of microscope types, for example inverse or upright transmitted light microscopes.

Figure 1:
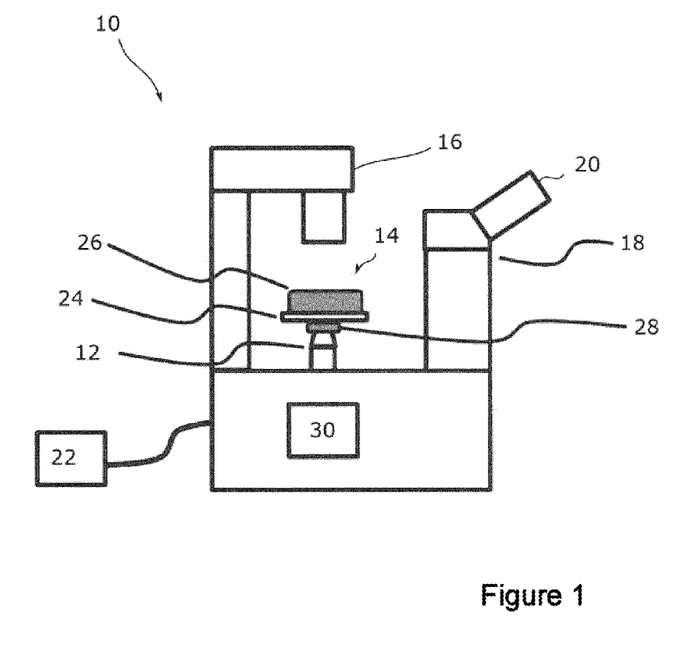
FIG. 1 shows a schematic illustration of an inverse transmitted light microscope as a first exemplary embodiment.

FIG. 1 shows a microscope 10 as a first exemplary embodiment, to which the refractive index determination according to the invention is applicable.

The microscope 10 is embodied as an inverse transmitted light microscope. It accordingly comprises an objective 12, which faces from below toward a sample chamber identified by 14 in FIG. 1, and a light source 16, which is oriented from above on the sample chamber 14. The microscope 10 furthermore has a lens barrel 18 having an eyepiece 20, through which an operator can observe a sample image received by the objective 12. Moreover, a control unit 22 is provided, which activates the various microscope components.

A cover slip 24 for covering a sample is located in the sample chamber 14 of the microscope 10. An optical medium 26, in which the sample is embedded and which is referred to hereinafter as the embedding medium 26, is arranged on the cover slip 24. Furthermore, an immersion medium 28 is arranged in the sample chamber 14, which borders the objective 12 from above and the cover slip 24 from below in FIG. 1.

The microscope 10 furthermore has a device identified in general by the reference sign 30 in FIG. 1, which is used to ascertain the refractive index of the embedding medium 26 receiving the sample. The device is shown in greater detail in FIG. 2.

Figure 2:
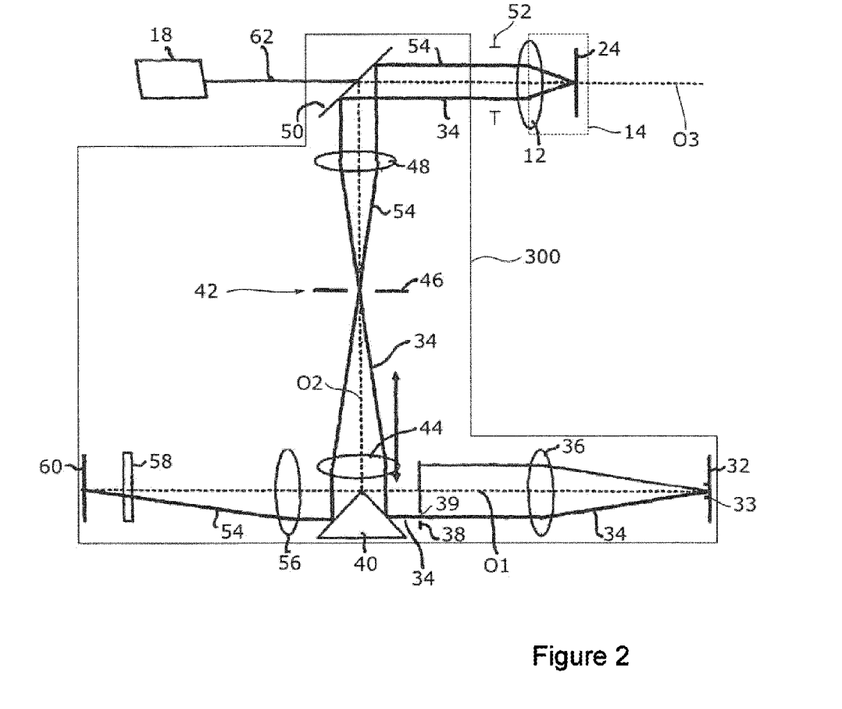
FIG. 2 shows a device intended for determining the refractive index of an optical medium, which is part of the microscope according to FIG. 1.

As shown in FIG. 2, the device 30 has a light source 32, which emits a measurement light beam 34 in the infrared wavelength range. The light source 32 is, for example, an LED, which has a slit diaphragm 33, by which the measurement light beam 34 is oriented on an illumination optical unit 36. After passing through the illumination optical unit 36, the measurement light beam 34 is incident on an aperture diaphragm 38, which is positioned centrally on the optical axis O1 of the illumination optical unit 36 and has a diaphragm opening 39, which is arranged in a decentered manner at a distance to the optical axis O1 of the illumination optical unit 36. The diaphragm opening of the aperture diaphragm 38 delimits the beam cross section of the measurement light beam 34 in such a way that only the part of the measurement light beam 34 located below the optical axis O1 of the illumination optical unit 36 in FIG. 2 passes the aperture diaphragm in the direction of a deflection prism 40.

The measurement light beam 34 delimited in its beam cross section is reflected at the deflection prism 40 into a transport optical unit 42, which is formed from a focusing lens 44 displaceable along its optical axis O2, a scattered light diaphragm 46, and a further lens 48. After passing through the transport optical unit 42, the measurement light beam 34 is incident on a dichroic beam splitter 50, which reflects light in the infrared wavelength range, while it transmits light in the visible range. The measurement light beam 34 is reflected in the direction of the objective 12 by the dichroic mirror 50. The measurement light beam 34 reflected at the dichroic mirror 50 extends here with a parallel offset to the optical axis O3 of the objective 12. In this way, the measurement light beam 34 is conducted into a section of an entry pupil 52 of the objective 12, which is laterally offset in relation to the optical axis O3 of the objective 12 and thus in relation to the center of the entry pupil 52 (cf. FIG. 3). The entry pupil 52 of the objective 12 is thus backlit in a decentralized manner, which has the result that the measurement light beam 34 is deflected into the sample chamber 14 at an angle α obliquely to the optical axis O3.

For the sake of simplicity, the embedding medium 26 and the immersion medium 28, which border the cover slip 24 in the sample chamber 14 from opposite sides, are omitted in the illustration according to FIG. 2. The measurement light beam 34 conducted with oblique incidence into the sample chamber 14 is reflected at the cover slip 24, as is explained in greater detail below with reference to FIG. 3, whereby two reflection beams conducted back into the objective 12 result, which are shown in the schematic view according to FIG. 2 (in contrast to the detail view according to FIG. 3) in the form of a single light beam denoted by 54.

After passing through the objective 12, the two reflection light beams 54 are incident on the dichroic mirror 50, which deflects the reflection light beams 54 into the transport optical unit 42. After passing the transport optical unit 42, the reflection light beams 54 are incident on the deflection prism 40, which reflects the reflection light beams 54 onto a detector optical unit 56. The detector optical unit 56 orients the reflection light beams 54 on a spectral filter 58, which is only transmissive for light in the infrared wavelength range and blocks scattered light outside this wavelength range. The reflection light beams 54 transmitted through the spectral filter 58 are finally incident on a position-sensitive detector 60, which is capable of registering the intensities of the reflection light beams 54 in a location-resolved manner.

For the sake of completeness, the coupling of the lens barrel 18 to the device 30 implemented via the dichroic mirror 50 is also illustrated in FIG. 2. The dichroic mirror 50 is accordingly also used in the present exemplary embodiment to supply the visible detection light 62, which is used for the actual microscopic imaging, and which the objective 12 conducts out of the sample chamber 14 in the direction of the dichroic mirror 50, by transmission to the lens barrel 18.

Figure 3:
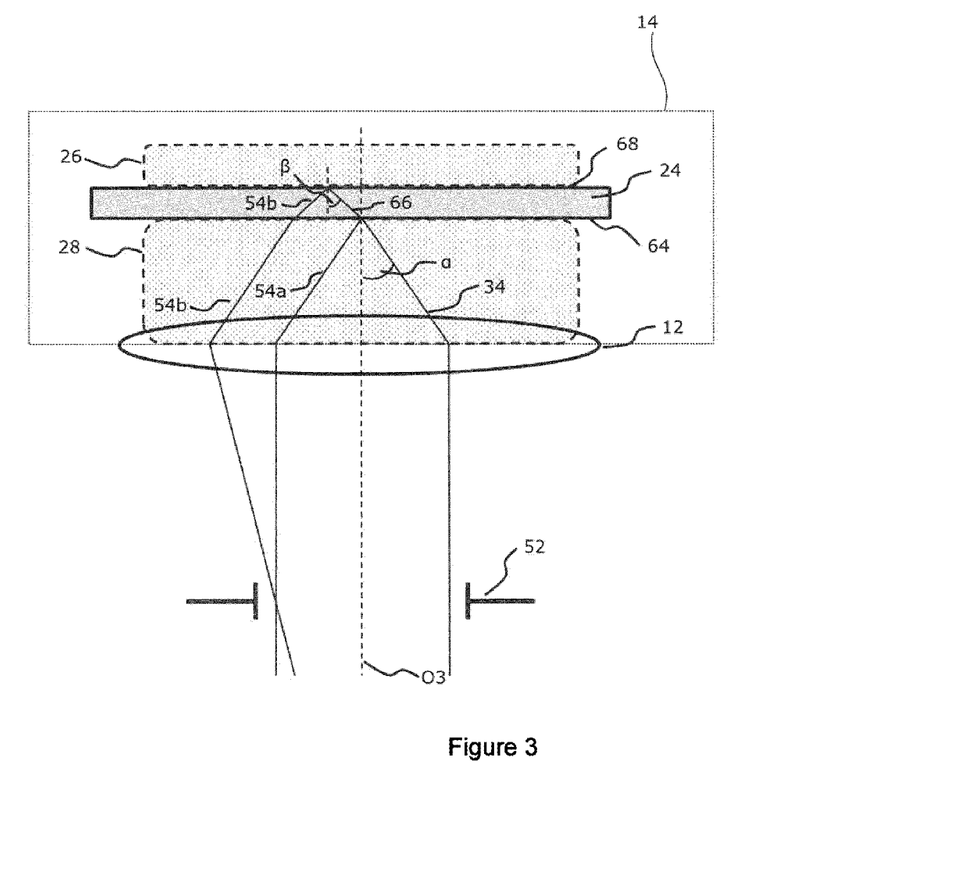
FIG. 3 shows a schematic illustration, which shows a sample chamber of the microscope according to FIG. 1.

FIG. 3 shows in greater detail how the two reflection light beams (denoted by 54a and 54b in FIG. 3), which are used according to an embodiment of the invention for determining the refractive index of the embedding medium 26, are generated by reflection of the measurement light beam. Accordingly, the measurement light beam 34 backlighting the entry pupil 52 of the objective 12 in a decentralized manner is deflected by the objective 12 at an angle α obliquely to the optical axis O3 onto the front face of the cover slip 24, which faces toward the objective 12 and is denoted by 64 in FIG. 3. Since the cover slip 24 and the immersion medium 28 bordering its front face 64 have different refractive indices, the front face 64 of the cover slip 24 and the immersion medium 28 adjoining thereon form a first interface, at which the incident measurement light beam 34 is partially reflected. The part of the measurement light beam reflected at this first interface generates the first reflection light beam 54a, which is conducted back into the objective 12.

The other part 66 of the measurement light beam 34, which the first interface transmits, is diffracted away from the optical axis O3 of the objective 12 upon entry into the cover slip 24 and encloses an angle β with this axis, which is greater than the angle α. This transmitted part 66 of the measurement light beam 34 is partially reflected at a second interface, which is defined by the rear face 68 of the cover slip 24 and the embedding medium 26 adjoining thereon, which has a different refractive index than the cover slip 24. The second reflection light beams 54b is generated by this second partial reflection of the measurement light beam 34 on the second interface, which passes through the front face 64 of the cover slip 24 and then arrives back in the objective 12.

As shown in the illustration according to FIG. 3, the oblique incidence of the measurement light beam 34 in the sample chamber 14 ensures that the reflection light beams 54a, 54b generated by the two partial reflections on the front face 64 and the rear face 68, respectively, of the cover slip 24 arrive back in the objective 12 on different optical paths. In this way, the two reflection light beams 54a, 54b are incident at different incidence locations on the position-sensitive detector 60. In other words, the two measurement patterns generated in the form of the slit images at the front face 64 or the rear face 68, respectively, of the cover slip 24 are imaged spatially separated from one another on the position-sensitive detector 60, as illustrated in the diagram according to FIG. 4.

Figure 4:
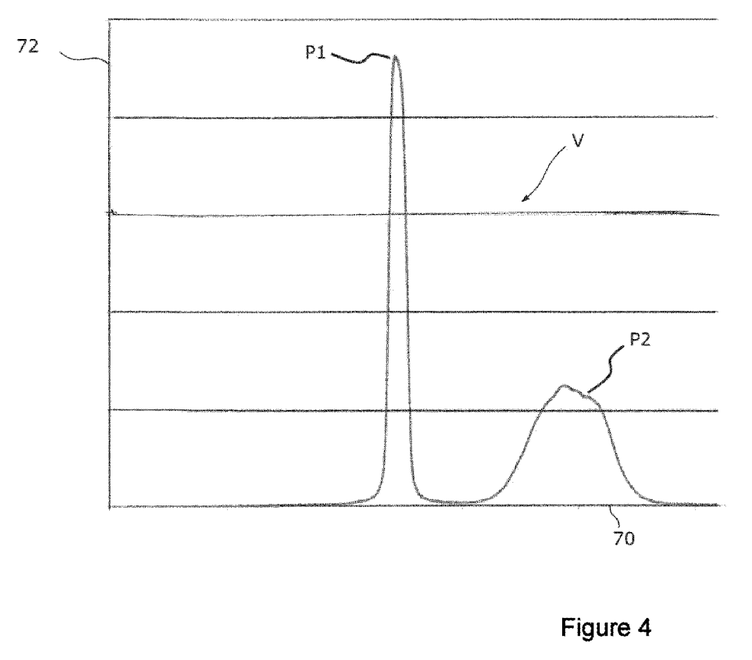
FIG. 4 shows an intensity distribution registered by a position-sensitive detector of the device according to FIG. 2.

FIG. 4 shows an exemplary intensity distribution V, which the two reflection light beams 54a, 54b jointly generate on the position-sensitive detector 60. The abscissa 70 of the diagram shows the incidence location on the detector 60 and the ordinate 72 shows the intensity measured at the respective incidence location. The intensity distribution V according to FIG. 4 shows two peaks, of which the peak denoted by P1 is associated with the first reflection light beam 54a and the peak denoted by P2 is associated with the second reflection light beam 54b. It may be seen from the fact that the peak P1 is taller and sharper than the peak P2 that in the example according to FIG. 3, the measurement light beam 34 is focused on the front face 64 of the cover slip 24. This means that a focused image of the slit diaphragm 33 of the light source 32 is generated on the front face 64 of the cover slip 24, while an image of the slit diaphragm 33 defocused in relation thereto results on the rear face 68 of the cover slip 24. This corresponds in this regard to the illustration according to FIG. 3, as the first partial reflection takes place on the front surface 64 of the cover slip 24 at a point which is centered on the optical axis O3 of the objective 12. In contrast, the second partial reflection takes place on the rear face 38 of the cover slip 24 at a point offset thereto transversely to the optical axis O3. The areas below the peaks P1, P2 shown in FIG. 4 are each a measure of the intensity of the respective reflection light beam 54a, 54b.

Figure 5:
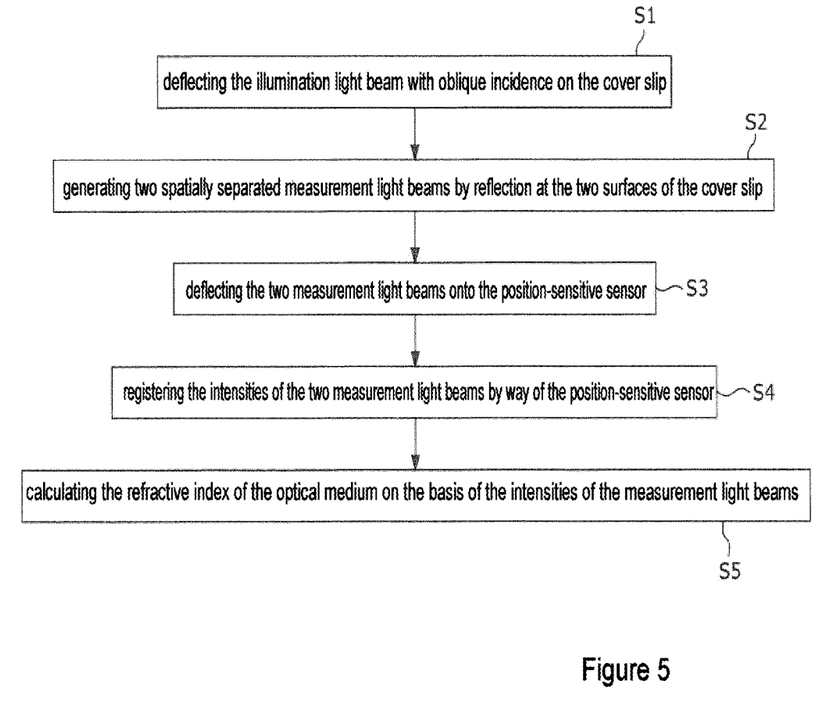
FIG. 5 shows a flow chart which shows a special embodiment of the method according to the invention for determining the refractive index.

FIG. 5 shows a flow chart, which illustrates solely as an example how the refractive index of the embedding medium 26 can be ascertained according to an embodiment of the invention.

In a first step S1, the measurement light beam 34 is conducted through the objective 12 into the sample chamber 18. After passing through the immersion liquid 28, the measurement light beam 34, as shown in FIG. 3, is obliquely incident at the angle α on the front face 64 of the cover slip 24. The angle α can be determined from the distance between the objective 12 and the front face 64 of the cover slip 24 and also the numerical aperture of the measurement light beam 34. The numerical aperture 34 of the measurement light beam results by means of the focal length of the objective 12 and the position of the measurement light beam 34 in the entry pupil 52 of the objective 12 or by means of the positioning of the diaphragm opening 39 of the aperture diaphragm 38 and the enlargement scale, at which the aperture diaphragm 38 is imaged in the entry pupil 52 of the objective 12.

In a second step S2, the two reflection light beams 54a, 54b spatially separated from one another are generated by the two partial reflections on the front face 64 and the rear face 68, respectively, of the cover slip 24.

In a third step S3, the two reflection light beams 54a, 54b are conducted onto the position-sensitive detector 60. Since the two reflection light beams 54a, 54b are spatially separated from one another, they are incident at different incidence locations on the position-sensitive detector 60.

In a fourth step S4, the intensities, denoted hereinafter as $I_a$ and $I_b$, of the two reflection light beams 54a, 54b are registered by the position-sensitive detector 60. This is carried out, for example, by integration of the intensity distribution V shown in FIG. 4. The areas below the two peaks P1, P2 of the intensity distribution V are thus each a measure of the intensity of the respective reflection light beam 54a, 54b. The respective intensity $I_a$, $I_b$ can thus be determined by integration of the measurement signal or a curve, for example a Gaussian curve, adapted to the respective peak P1, P2.

Finally, in a fifth step S5, the refractive index of the embedding medium 26 is ascertained on the basis of the intensities $I_a$, $I_b$ of the two reflection light beams 54a, 54b. The following considerations are the basis for this purpose.

It is explained hereinafter how the intensities $I_a$, $I_b$ of the two reflection light beams 54a and 54b may be calculated in detail.

The intensity $I_a$ of the reflection light beam 54a results according to the following equation:

$$I_a = (S \cdot R_{a\perp} + (1-S) \cdot R_{a\|}) \cdot I \quad (1)$$

In this case, $R_{ai}$ denotes reflectivities of the interface 64 formed by the cover slip 24 and the immersion medium 28 for perpendicular (i=⊥) and parallel (i=∥) polarized light, which is incident at an angle 90°-α and is given in the present case by the measurement light beam 34. Furthermore, S denotes the intensity component of perpendicular polarized light and I the intensity of the measurement light beam 34.

The intensity $I_b$ of the reflection light beam 54b results according to the following equation:

$$I_b = (S \cdot T_{a\perp} \cdot R_{b\perp} \cdot T_{a\perp}' + (1-S) \cdot T_{a\|} \cdot R_{b\|} \cdot T_{a\|}') \cdot I \quad (2)$$

In this case, $R_{bi}$ and $T_{bi}$ denote the reflectivity and transmittance, respectively, of the interface 68 formed by the cover slip 24 and the embedding medium 26 for perpendicular (i=⊥) and parallel (i=∥) polarized light, which is incident at an angle 90°-β and is given in the present case by the transmitted part 66 of the illumination light beam 34. $T_{ai}$ denotes the transmittances of the first interface 64 for perpendicular (i=⊥) and parallel (i=∥) polarized light, which is incident at an angle 90°-α and is given in the present case by the measurement light beam 34. Furthermore, $T'_{ai}$ denotes the transmittances of the interface 64 for perpendicular (i=⊥) and parallel (i=∥) polarized light which is incident at an angle 90°-β and is given in the present case by the part which is reflected at the interface 68 back in the direction of the objective 12.

The ratio of the two intensities $I_a$, $I_b$ is independent of the intensity I of the measurement light beam 34, as shown by the following equation:

$$\frac{I_b}{I_a} = \frac{(S \cdot T_{a\perp} \cdot R_{b\perp} \cdot T'_{a\perp} + (1-S) \cdot T_{a\|} \cdot R_{b\|} \cdot T'_{a\|})}{(S \cdot R_{a\perp} + (1-S) \cdot R_{a\|})} \quad (3)$$

The present case is therefore a self-referential measurement. The reflectivities and transmittances $R_i$ and $T_i$ can be determined with the aid of the Fresnel formulae (see BORN and WOLF, Principles of Optics, Cambridge University Press, seventh edition, 1999, pages 40 to 45), on the basis of the refractive indices of the optical media 26, 28 at the interfaces 64, 68 and the numerical aperture of the incident measurement light beam 34. The numerical aperture of the measurement light beam 34 may be determined via the focal length of the objective 12 and the position of the measurement light beam 34 in the entry pupil 52 of the objective 12.

With known numerical aperture of the measurement light beam 34 and known refractive indices of the immersion medium 28 and the cover slip 24, the refractive index of the embedding medium 26 is the only unknown and can be determined by means of equation (3). This can be carried out analytically, by numerical methods, or with the aid of a lookup table having tabulated values and interpolation.

Figure 6:
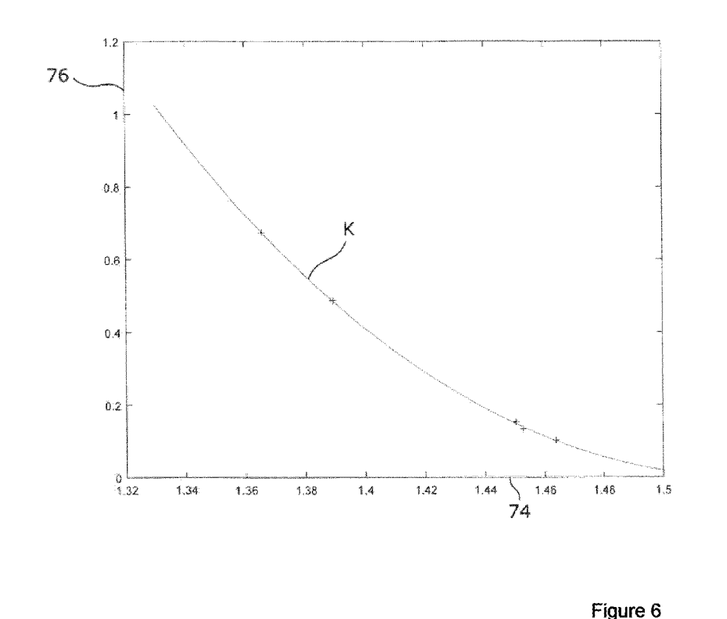
FIG. 6 shows a characteristic curve which indicates the ratio of the intensities of the two reflection light beams as a function of the refractive index of the embedding medium.

FIG. 6 shows an exemplary characteristic curve K, which indicates the ratio of the two intensities $I_a$, $I_b$ as a function of the refractive index of the embedding medium 26. The refractive index of the embedding medium 26 is indicated on the abscissa axis 74 of the diagram. The ratio of the two intensities $I_a$, $I_b$ is indicated on the ordinate axis 76 of the diagram. Water was used as the immersion medium 28 in the ascertainment of the intensities $I_a$, $I_b$.

Figure 7:
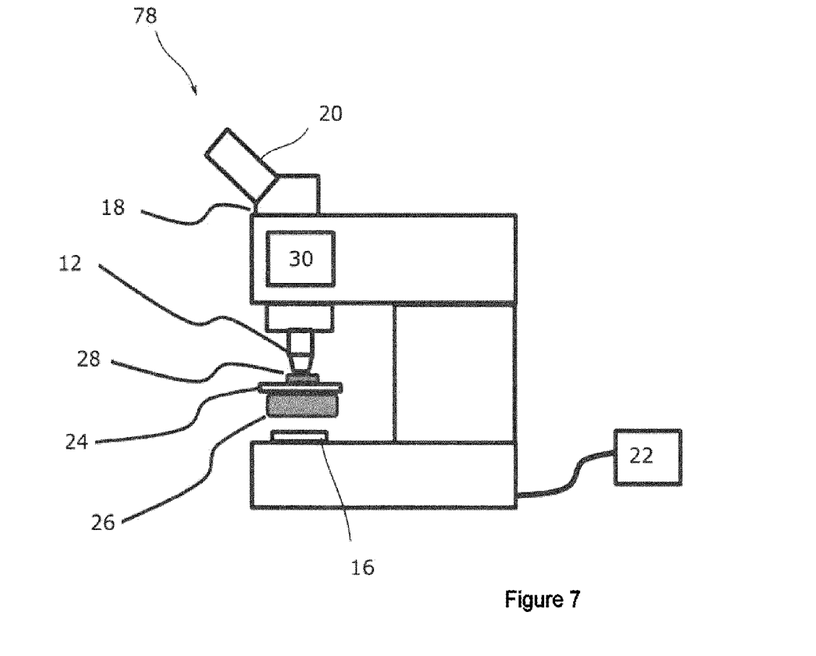
FIG. 7 shows a schematic illustration of an upright transmitted light microscope, which forms a second exemplary embodiment of the microscope according to the invention.

FIG. 7 shows a microscope 78 which, in contrast to the microscope 10 shown in FIG. 1, is embodied as an upright transmitted light microscope. In FIG. 7, the microscope components which correspond to the components of the microscope 10 according to FIG. 1 are provided with the reference signs already used in FIG. 1.

In contrast to the embodiment according to FIG. 1, in the microscope shown in FIG. 7, the objective 12 is arranged above the sample chamber 18, while the light source 16 is located below the sample chamber 18. The immersion medium 28, which borders the objective 12, on the one hand, and the cover slip 24, on the other hand, is accordingly located above the cover slip 24, while the embedding medium 26, the refractive index of which is to be determined according to an embodiment of the invention, is arranged below the cover slip 24.

The determination according to an embodiment of the invention of the refractive index of the embedding medium 28 is carried out in the microscope 78 according to FIG. 7 in the same way as in the microscope 10 shown in FIG. 1.

The invention was explained above by means of special exemplary embodiments. It is obvious that the invention is not restricted to these exemplary embodiments and an array of modifications are possible.

Thus, in the example according to FIG. 3, a focused image results on the front face 64 of the cover slip 24 and a defocused image of the slit diaphragm 33 results on the rear face 68 of the cover slip 64. However, it is also possible, vice versa, to generate the focused slit image on the rear side 68 and the focused slit image on the front face 64 of the cover slip 24. The focal plane can also be located within the cover slip 24, so that neither of the two slit images is focused.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 microscope
12 objective
14 sample chamber
16 light source
18 lens barrel
20 eyepiece
22 control unit
24 cover slip
26, 28 optical medium
30 device
32 light source
33 slit diaphragm
34 measurement light beam
36 illumination optical unit
38 aperture diaphragm
39 diaphragm opening
40 deflection prism
42 transport optical unit
44 focusing lens
46 scattered light diaphragm
50 beam splitter
52 entry pupil
54, 54a, 54b reflection light beam
56 detector optical unit
58 spectral filter
60 detector
62 imaging beam path
64, 68 surface
66 transmitted measurement light beam
70, 74 abscissa
72, 76 ordinate
K characteristic curve
O1, O2, O3 optical axis
P1, P2 peak
V intensity distribution
β, β angle

The invention claimed is:

1. A method for determining a refractive index of an optical medium in a microscope, which has an objective facing toward a sample chamber, wherein the optical medium having the refractive index to be determined is one of two optical media, which border two opposing surfaces of a cover slip or object carrier in the sample chamber and form two partially reflective interfaces, which are arranged at different distances from the objective, the method comprising:
   deflecting a measurement light beam by the objective with oblique incidence on the cover slip or object carrier;
   generating two reflection light beams spatially separated from one another by the measurement light beam being partially reflected at each of the two partially reflective interfaces;
   receiving the two reflection light beams by the objective and conducting the two reflection light beams onto a position-sensitive detector;
   registering intensities of the two reflection light beams by the position-sensitive detector; and
   determining the refractive index of the optical medium based on the registered intensities of the two reflection light beams.

2. The method as claimed in claim 1, wherein the refractive index of the one optical medium is determined as a function of a refractive index of the other optical medium, a refractive index of the cover slip or object carrier, and a numerical aperture of the measurement light beam.

3. The method as claimed in claim 1, wherein the refractive index of the one optical medium is determined based on a ratio of the intensities of the two reflection light beams.

4. The method as claimed in claim 1, wherein the measurement light beam is conducted into a section of an entry pupil of the objective which is offset in relation to the center of the entry pupil.

5. The method as claimed in claim 1, wherein a measurement pattern is generated at each of the two partially reflective interfaces by the measurement light beam, and wherein the two measurement patterns are imaged by the two reflection light beams on the position-sensitive detector.

6. The method as claimed in claim 5, wherein the two measurement patterns imaged on the position-sensitive detector are registered in the form of a spatial intensity distribution, and wherein the intensities of the two reflection light beams are determined from the spatial intensity distribution.

7. The method as claimed in claim 1, wherein the one optical medium is an embedding medium for a sample which borders one of the two surfaces of the cover slip or object carrier.

8. The method as claimed in claim 7, wherein the other optical medium is an immersion medium which borders the other surface of the cover slip or object carrier and the objective.

9. A microscope, comprising:
a sample chamber having a cover slip or object carrier and two optical media;
an objective facing toward the sample chamber;
two partially reflective interfaces, which are arranged in the sample chamber at different distances from the objective and are formed such that the two optical media in the sample chamber border two opposing surfaces of the cover slip or object carrier; and
a device having a position-sensitive detector, the device being configured to determine a refractive index of one of the two optical media by:
deflecting a measurement light beam through the objective with oblique incidence on the cover slip or object carrier;
generating two reflection light beams spatially separated from one another in that the measurement light beam is partially reflected at each of the two partially reflective interfaces;
receiving the two reflection light beams through the objective and conducting the two reflection light beams onto the position-sensitive detector;
registering, by the position-sensitive detector, intensities of the two reflection light beams; and
determining the refractive index of the optical medium based on the registered intensities of the two reflection light beams.

10. The microscope as claimed in claim 9, wherein the device has an aperture diaphragm having a diaphragm opening, which is arranged in a decentered manner at a distance to the optical axis of the objective.

11. The microscope as claimed in claim 9, wherein the device has a light source, which emits the measurement light beam in the infrared wavelength range.

12. The microscope as claimed in claim 9, wherein the position-sensitive detector is a line detector.

13. The microscope as claimed in claim 9, wherein the device includes storage, in which parameters for determining the refractive index of the optical medium are storable.

14. The microscope as claimed in claim 9, wherein the opposing surfaces of the cover slip or object carrier are formed plane-parallel to one another.

15. The microscope as claimed in claim 9, wherein the microscope is an inverse microscope or an upright microscope.

* * * * *